United States Patent [19]

Striffler

[11] Patent Number: 5,207,100
[45] Date of Patent: May 4, 1993

[54] METHOD AND DEVICE FOR MEASURING UNDERWATER VEHICLE HULL VIBRATION

[75] Inventor: Foster L. Striffler, East Lyme, Conn.

[73] Assignee: The United States of America as represented by the Secretary of the Navy, Washington, D.C.

[21] Appl. No.: 735,986

[22] Filed: Jul. 25, 1991

[51] Int. Cl.$^5$ ............................................. G01H 13/00
[52] U.S. Cl. ...................................................... 73/583
[58] Field of Search ........................... 73/579, 583, 659

[56] References Cited

U.S. PATENT DOCUMENTS

| | | | |
|---|---|---|---|
| 4,689,993 | 9/1987 | Slettemoen | 73/579 |
| 4,877,488 | 10/1989 | Cody et al. | 73/579 |
| 4,894,787 | 1/1990 | Flannelly et al. | 73/583 |

FOREIGN PATENT DOCUMENTS 0193425  11/1983  Japan ...................... 73/659

Primary Examiner—Hezron E. Williams
Assistant Examiner—Rose M. Finley
Attorney, Agent, or Firm—Michael J. McGowan; Prithvi C. Lall; Michael F. Oglo

[57] ABSTRACT

A method and device for measuring higher mode vibrational energy is provided. The device includes a plurality of sensors placed with uniform spacing around the circumference of a structure and a processing unit. The sensor placement may be either on the inside or the outside of a structure depending on the structure and on the experiment. In operation, signals from individual sensors, preamplified if required, are fed to processing equipment. The processing equipment performs a double Fast Fourier Transform. The first transform is done on temporal data thereby providing an output representing a frequency spectrum. The second transform is performed on simultaneous data readings from all sensor locations thereby providing an output representing a spectrum of mode numbers. The combining of these outputs provides a three-dimensional plot of amplitude versus frequency and mode number.

9 Claims, 2 Drawing Sheets

METHOD AND DEVICE FOR MEASURING UNDERWATER VEHICLE HULL VIBRATION

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The invention relates generally to vibration measurements and more particularly to temporal and spatial analysis using multiple sensors.

(2) Description of the Prior Art

Hull design for underwater vehicles requires determination of vibrational modes of various structures and shapes. The frequency response of a hull affects the hull drag characteristics, noise produced by the hull flow field, and the fatigue strength of the structure. The current method of measuring higher mode vibrational energy on structures is to place a sensor at a particular location on the structure and then excite the structure by striking or shaking the structure with a mechanical driver. This process is repeated, moving the sensor to different locations on the structure. Several disadvantages and drawbacks result from this process. First, the present sequential process requires multiple experimental set-ups and steps. These multiple set-ups and steps place undue demands on scarce test facilities and limited personnel resources. Finally, the present process does not provide higher mode measurements directly, instead requiring extensive computational processing.

SUMMARY OF THE INVENTION

An object of the present invention is to provide a means for rapid and direct measurement of higher mode vibrational characteristics of cylindrical structures.

It is a further object of the invention to provide a multi-sensor device for simultaneous measurement of multiple locations on a cylindrical structure.

It is yet another object of the invention to perform both temporal and spatial analysis of vibrational signals thereby providing direct determination of higher mode vibrational characteristics.

The invention is a device and method for measuring higher order vibrational modes. The device includes a plurality of accelerometers placed at equally-spaced intervals around the circumference of a cylindrical structure. Signals from the accelerometers are amplified in a preamplifier and then fed to a processor which performs a Fast Fourier Transform on the temporal sample and then performs a second Fast Fourier Transform on the angular sample. The outputs of the transforms are, respectively, a frequency spectrum and mode number spectrum. The combining of the frequency and mode number outputs provides a three-dimensional plot of amplitude versus frequency and mode number which is displayed on a CRT monitor and/or a plotter.

BRIEF DESCRIPTION OF THE DRAWINGS

The foregoing objects and other advantages of the invention will be better understood from the following description and reference to the appended drawings wherein.

DESCRIPTION OF THE PREFERRED EMBODIMENTS

Figure 1:
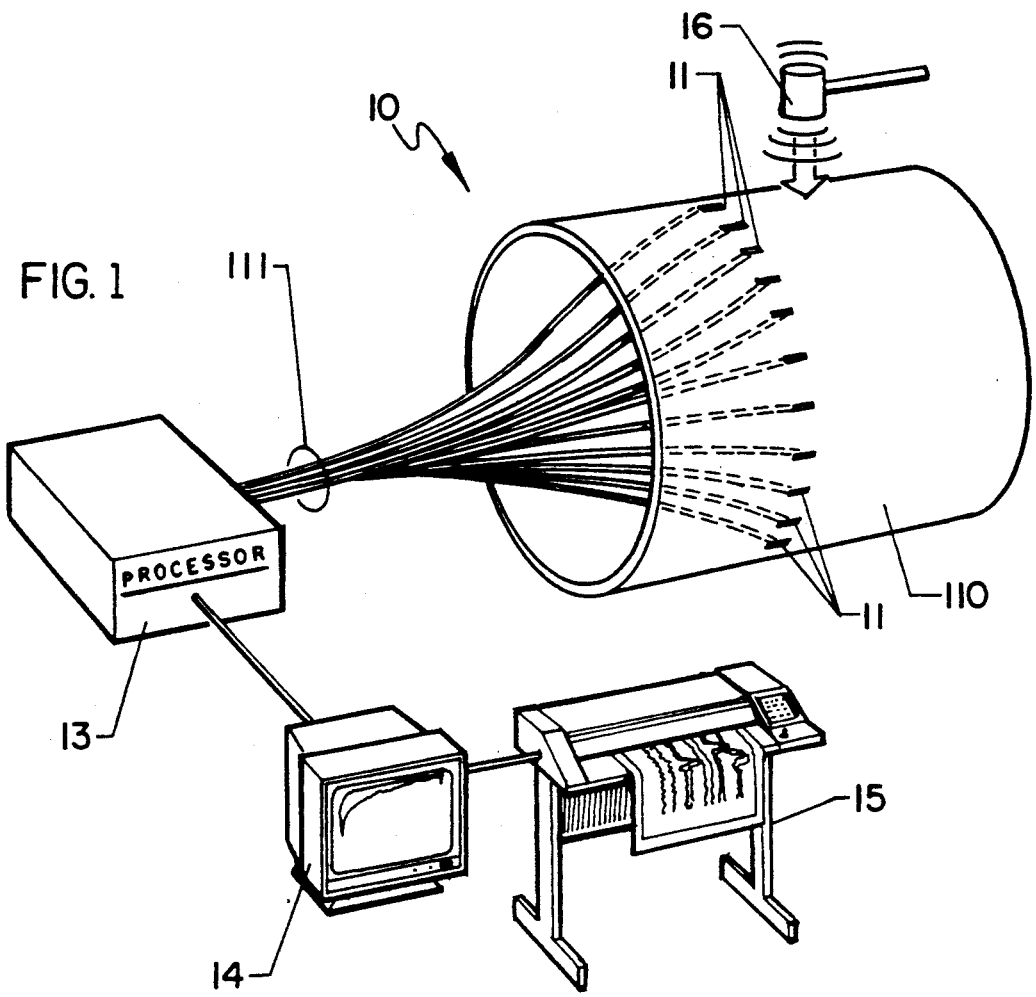
FIG. 1 is a perspective view of the measurement device installed on a cylindrical test structure.

FIG. 1 shows the higher mode vibration measuring device, designated generally by the reference numeral 10, with three major components. Higher mode vibration refers to the shape of the structure as it vibrates. For example, for mode "0" the structure would expand and contract uniformly around the circumference, for mode "2" the structure would expand on the top and bottom while the side would contract inward and then reverse. Mode "3" would generate three lobes, and so forth. The components for determining these modes are the array of sensors 11, the signal processor 13, and the display unit 14. Sensors 11 in the sensor array are spaced at uniform intervals around the circumference of cylindrical structure 110. Electrical leads 111 connect each sensor 11 to processor 13. Signals from sensors 11 may be preamplified by a plurality of preamplifiers disposed at the sensor end of each lead 111 if required by a particular application.

Processor 13 performs two operations on signals received from the sensors. The first operation is a Fast Fourier Transform on temporal samples from each of the sensors. For N sensors this will result in N frequency responses. The second operation is a spatial Fast Fourier Transform. The frequency responses are divided into M equally spaced frequencies. At each particular frequency, the complex value of the frequency response of each sensor is used to calculate the spatial Fast Fourier Transform. These two operations will result in a N by M matrix of values which is sent to a display unit 14 or plotter 15 and depicts a three-dimensional plot of amplitude versus frequency and mode number. The combining of both outputs provides a three-dimensional plot of amplitude versus frequency and mode number.

Any quantity of sensors may be used and these sensors may be selected from a variety of devices including accelerometers, hydrophones, microphones, or other pressure, velocity, acceleration, or displacement sensors. The key feature of the invention is that the sensors must be located at equally spaced intervals around the circumference of the structure to be tested and must be capable of providing a sufficiently rapid response to permit time sampling of the signals.

Figure 2:
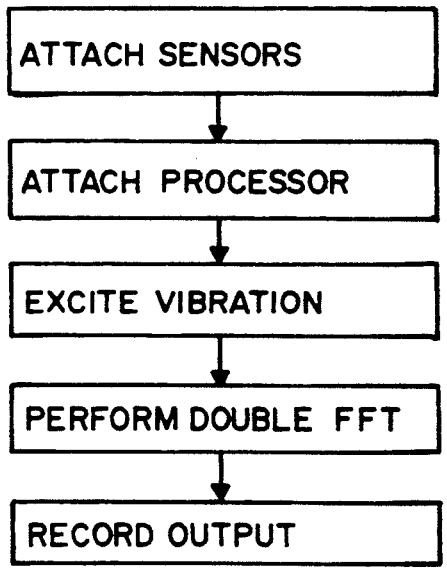
FIG. 2 is a block diagram depicting the functional elements of the measurement device of this invention.

Additionally, the structure to be tested must by cylindrical or circular to conform to the selected modeling of the double Fast Fourier Transform. Operation of the double Fast Fourier Transform is well known and is mathematically described by $$G(f,MN) = + \int_{-T}^{T} \int_{-\pi}^{+\pi} g(\tau,\theta) \text{EXP}[-j2\pi(f\tau + MN\theta)] d\tau d\theta \quad (1)$$

Where G and g are complex functions and where $f$ = frequency, hertz $MN$ = mode number $t$ = time, seconds $\theta$ = angle, radians $j = \sqrt{-1}$ $G(f,MN)$ is the output signal representing frequency mode number and amplitude $g(\tau,\theta)$ is the complex signal from the sensors $\tau$ is the range of time samples The corresponding physical operation of the device may be understood by reference to FIG. 2 which shows the sequence of steps required by the present invention. Sensors are attached to the structure to be tested and located with equal spacing around the circumference of the structure. The processor is attached to the sensors and to the desired output device, that is, a video display or a plotter.

Figure 3:
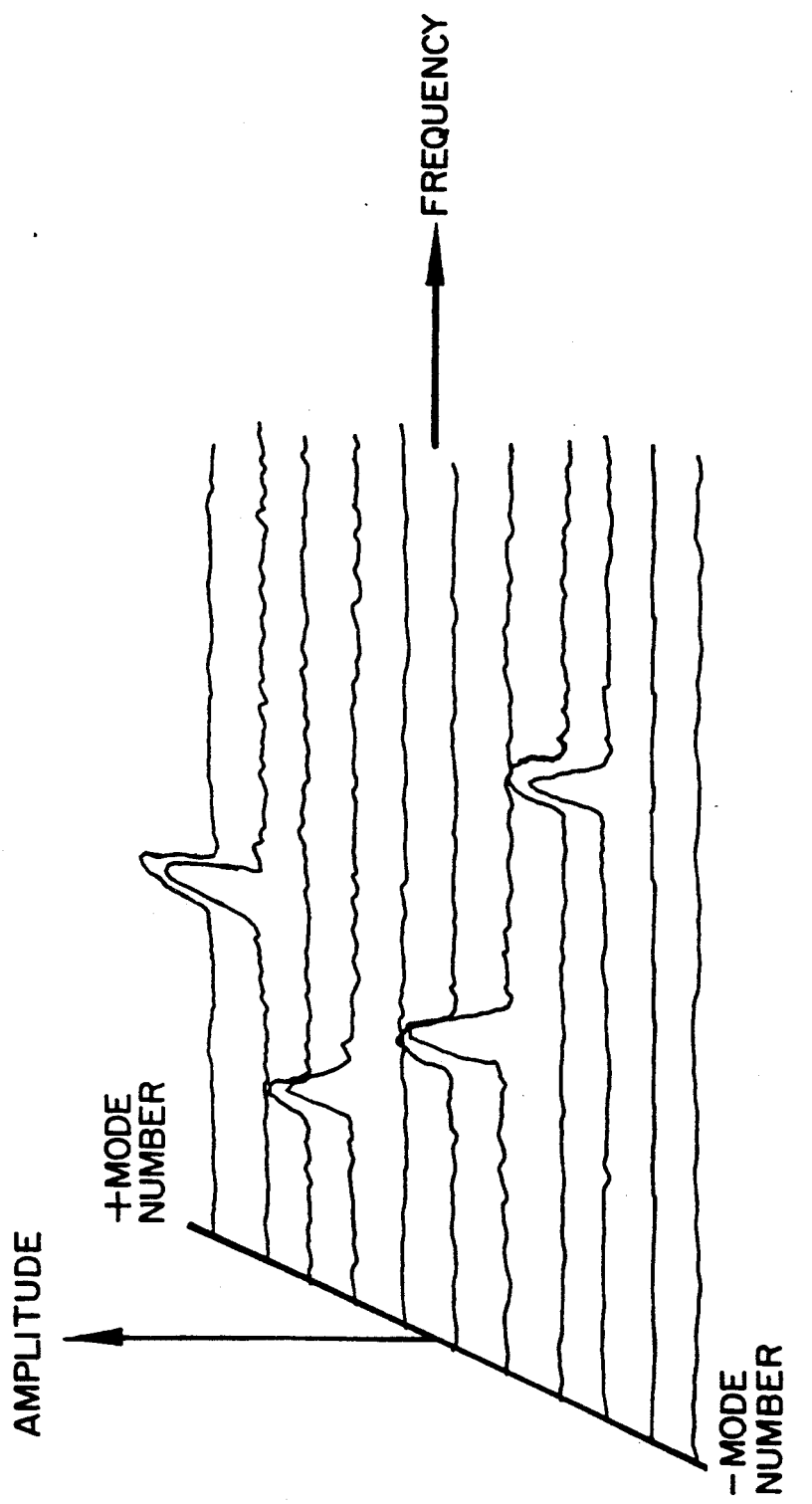
FIG. 3 is a typical three-dimensional plot of amplitude versus frequency and mode number.

The structure to be tested is then caused to vibrate by mechanical or other excitation perturbation 16 shown in FIG. 1. The sensors detect the induced vibration and send proportional signals to the processor where double Fast Fourier Transforms provide processing of both temporal and spatial signal samples. The output of the processor is sent to the display unit and/or the plotter to provide a three-dimensional frequency and mode number versus amplitude plot, a sample of which is shown in FIG. 3.

The advantages of the invention are numerous. The invention requires only a single experimental setup. The equally-spaced circumferential sensors combined with the double Fast Fourier Transform processing provide a unique result in that direct measurement of mode numbers can be accomplished in just one step. Further, a single output can be generated showing the relationship of frequency, mode number and amplitude.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A device for measuring higher order vibrational modes on a cylindrical structure comprising:
   a plurality of sensors uniformly spaced around a circumference of said cylindrical structure;
   processing equipment, connected to and receiving signals from said plurality of sensors, for computing a temporal Fast Fourier Transform and a spatial Fast Fourier Transform, whereby said spatial Fast Fourier Transform is a double Fast Fourier Transform;
   means for controlling said processing equipment to provide a temporal Fast Fourier Transform and a spatial Fast Fourier Transform; and
   output display means, connected to said processing equipment, for displaying said temporal and spatial Fast Fourier Transforms, thereby providing a three-dimensional plot of amplitude versus frequency and mode number.

2. A device for measuring higher order vibrational modes as in claim 1 wherein said plurality of sensors comprise a plurality of accelerometers.

3. A device for measuring higher order vibrational modes as in claim 1 wherein said plurality of sensors comprise a plurality of hydrophones.

4. A device for measuring higher order vibrational modes as in claim 1 wherein said plurality of sensors comprise a plurality of piezoelectric cells.

5. A device for measuring higher order vibrational modes as in claim 1 wherein said plurality of sensors comprise a plurality of microphones.

6. A device for measuring higher order vibrational modes as in claim 1 wherein said processing equipment comprises a microcomputer.

7. A device for measuring higher order vibrational modes as in claim 1 wherein said output display means is a video display suitable for receiving output from a microcomputer.

8. A device for measuring higher order vibrational modes as in claim 1 wherein said output display means is a plotter suitable for receiving output from a microcomputer.

9. A method for measuring higher order vibrational modes on a cylindrical structure comprising the steps of:
   providing a cylindrical structure to be tested;
   attaching sensors equally-spaced around a circumference of said cylindrical structure;
   exciting vibrational modes in said cylindrical structure;
   sensing temporal and spatial vibrational signals;
   processing sensor output by computing a temporal Fast Fourier Transform and a spatial Fast Fourier Transform, whereby said spatial Fast Fourier Transform is a double Fast Fourier Transform; and
   displaying output results of said transforms.

* * * * *